United States Patent [19]

Motoki et al.

[11] Patent Number: 4,622,176

[45] Date of Patent: Nov. 11, 1986

[54] METHOD OF PROCESSING RADIOACTIVE LIQUID WASTES CONTAINING RADIOACTIVE RUTHENIUM

[75] Inventors: Ryozo Motoki; Shoji Motoishi; Mishiroku Izumo; Katsuyuki Onoma, all of Ibaraki; Toshikazu Sato, Tokyo, all of Japan

[73] Assignees: Japan Atomic Energy Research Institute; Mitsui Mining & Smelting Co., both of Tokyo, Japan

[21] Appl. No.: 680,701

[22] Filed: Dec. 10, 1984

[30] Foreign Application Priority Data

Dec. 15, 1983 [JP] Japan ................................ 58-237131

[51] Int. Cl.[4] .......................... G21F 9/12; G21F 9/04; C01G 55/00

[52] U.S. Cl. .................................... 252/631; 210/682; 210/684; 252/626; 423/2; 423/22

[58] Field of Search .................... 252/626, 631; 423/2, 423/6, 7, 22; 210/682, 683, 684, 685, 717

[56] References Cited

U.S. PATENT DOCUMENTS

| | | | |
|---|---|---|---|
| 3,694,370 | 9/1972 | Panesko | 252/631 |
| 3,848,048 | 11/1974 | Moore | 252/631 |
| 4,116,863 | 9/1978 | Berton et al. | 423/22 |
| 4,178,270 | 12/1979 | Fujita et al. | 252/631 |
| 4,277,565 | 7/1981 | Oda et al. | 423/7 |
| 4,282,112 | 8/1981 | Fitoussi et al. | 252/631 |
| 4,331,551 | 5/1982 | Berton et al. | 252/631 |

FOREIGN PATENT DOCUMENTS 0050698 3/1982 Japan .

*Primary Examiner*—Stephen J. Lechert, Jr.
*Assistant Examiner*—Howard J. Locker
*Attorney, Agent, or Firm*—Browdy and Neimark

[57] ABSTRACT

A method of processing radioactive liquid wastes containing radioactive ruthenium by passing said wastes through a column packed with an adsorbent comprising a mixture of activated carbon with zinc and palladium powders is herein disclosed.

2 Claims, No Drawings

METHOD OF PROCESSING RADIOACTIVE LIQUID WASTES CONTAINING RADIOACTIVE RUTHENIUM

BACKGROUND OF THE INVENTION

A. Technical Field

The present invention relates to a method of processing radioactive liquid wastes containing radioactive ruthenium. More particularly, the invention relates to a method for processing such radioactive liquid wastes by using an adsorbent comprising a mixture of activated carbon with zinc and palladium powders.

B. Prior Art

Radioactive ruthenium ($^{106}Ru$) in radioactive liquid wastes react with nitric acid present in the processing of said wastes to form various nitrosyl compounds. Since these compounds are dissolved in the form of various complex salts, one method is capable of removing only a specific compound, and other nitrosyl compounds are left unremoved.

While many radioactive substances are present in the liquid wastes that are discharged into oceans from spent fuel reprocessing plants after being subjected to a chemical treatment such as concentration by evaporation, settlement by coagulation, or ion exchange reaction, $^{106}Ru$ accounts for more than half of such radioactive substances. However, experiments conducted so far have shown that $^{106}Ru$ cannot be removed with high efficiency by settlement after coagulation or ion exchange. The technique of concentration by evaporation is more effective than these two methods but its effectiveness is reduced if the radioactive liquid wastes contain a large amount of $^{106}Ru$ in an highly volatile chemical form.

Japanese Patent Public Disclosure No. 50698/1982 (Japanese Patent Application No. 126401/1980) shows a method of removing $^{106}Ru$ from radioactive liquid wastes by passing it through a column packed with a mixture of metal powder and activated carbon. However, this prior art technique has yet to be improved in respect of its ability to remove $^{106}Ru$.

As will be clear from the above explanation, $^{106}Ru$ is one of the nuclides that are most problematic in the processing of radioactive wastes, and the development of a safe and efficient method of removing $^{106}Ru$ without causing environmental pollution is greatly needed.

SUMMARY OF THE INVENTION

One object of the present invention is to provide a method of processing radioactive liquid wastes containing $^{106}Ru$.

Another object of the present invention is to provide a method of processing radioactive liquid wastes containing $^{106}Ru$ by passing said wastes through a column packed with an adsorbent comprising a mixture of activated carbon with zinc and palladium powders.

A further object of the present invention is to provide a method of regenerating a deactivated adsorbent comprising a mixture of activated carbon and zinc and palladium powders by washing the adsorbent with aqueous nitric acid or water.

Other object of the present invention and its advantages will become apparent by reading the following description.

DETAILED DESCRIPTION OF THE INVENTION

According to the present invention, $^{106}Ru$ can be removed from radioactive liquid wastes by passing it through a column packed with an adsorbent comprising a mixture of activated carbon with zinc and palladium powders.

A mixed adsorbent of zinc powder and activated carbon is conventionally used in removing $^{106}Ru$ from radioactive liquid wastes. The method of the present invention is characterized by adding a small amount of palladium powder to this mixture for the purpose of achieving a more efficient removal of $^{106}Ru$. A column packed with the conventional mixture of zinc powder and activated carbon requires an optimum use pH of about 2 and cannot be used in the neutral or alkaline region for achieving best results in the removal of $^{106}Ru$. However, by adding a small amount of palladium to the mixture of zinc powder and activated carbon, the optimum pH range for $^{106}Ru$ removal is extended to cover not only the acidic region but also the neutral and alkaline regions. Furthermore, the mixture of activated carbon with zinc and palladium powders has a higher efficiency of $^{106}Ru$ removal than the simple mixture of activated carbon and zinc powder. A probable reason for this higher efficiency would be as follows: palladium having a positive standard potential enhances the electrochemical action between the activated carbon anode and the powdered zinc cathode, and various nitrosyl ruthenium compounds are oxidized into more easily removable chemical forms. In other words, the method of the present invention utilizes both the adsorbing action of activated carbon and the electrochemical action that occurs between the carbon palladium electrode and the zinc electrode in the liquid electrolyte (liquid wastes). As a result, the method of the invention is capable of removing nitrosyl ruthenium compounds that are difficult to eliminate by the conventional techniques, and this contributes to the increased ability of the invention to remove $^{106}Ru$.

The ability of the adsorbent (mixture of activated carbon with zinc and palladium powders) to remove $^{106}Ru$ is not dependent on the pH of the solution that is fed through the column packed with said adsorbent. If the removal efficiency of the adsorbent is reduced, it can be regenerated or activated again by washing it with aqueous nitric acid or water.

Liquid wastes containing $^{106}Ru$ are processed as follows by the method of the present invention: the wastes after pH adjustment are passed through a column packed with an adsorbent comprising a 1:0.01:1 mixture of zinc powder, palladium powder and activated carbon; when the concentration of radioactive $^{106}Ru$ in the effluent from the column is increased as an indication of reduced removal efficiency, the passage of the liquid wastes are stopped, and instead, aqueous nitric acid or water is passed through the column to wash and reactivate the adsorbent; and thereafter, the next portion of the $^{106}Ru$ containing liquid wastes with a properly adjusted pH are passed through the regenerated column. By repeating this cycle, $^{106}Ru$ can be effectively removed from the liquid wastes.

The advantages of the present invention will become more apparent by reading the following Examples and Comparative Examples. The radioactive ruthenium containing feed that was processed by the method of the present invention in Example 1 was liquid wastes resulting from the production of $^{99}$Mo by the following procedure: uranium dioxide irradiated in a nuclear reactor was dissolved in nitric acid and $^{99}$Mo was extracted from the solution with an organic solvent, and the resulting highly radioactive liquid wastes were neutralized with sodium hydroxide for separation of sodium uranate by filtration. In Examples 2 and 3, as well as in Comparative Examples 1 and 2, group separated liquid wastes were used; high-level radioactive liquid wastes discharged from the spent nuclear fuel reprocessing plant at the Power Reactor and Nuclear Fuel Development Corporation was subjected to extraction of U, Pu and trans-Pu and other radioactive elements with organic solvents, and thereafter, nuclear fission products were separated by passing the liquid wastes through a zeolite or titanic acid packed column. Neither type of liquid wastes contained $^{106}$Ru in a cationic chemical form that could be readily removed by the coagulation/precipitation technique or ion exchange reaction. In both types of liquid wastes, $^{106}$Ru was present as various nitrosyl compounds most of which were in the form of anionic forms that could not easily be removed by any of the conventional chemical methods. Both types of liquid wastes contained about 0.4 mol of sodium nitrate and passed through the adsorbent-packed column at a flow rate of about 3 cm/min.

The column used in each of the Examples and Comparative Examples was made of glass and measured 8 mm in inside diameter and 200 mm long; each column was packed with 1.0 g of zinc powder (60–80 mesh), 0.01 g of palladium powder (−100 mesh) and 1.0 g of activated carbon (60–300 mesh).

The performance of the adsorbent was represented by a decontamination factor which was the ratio of the concentration of radioactive $^{106}$Ru in the feed to that in the effluent.

EXAMPLE 1

Six 50-ml portions of the liquid wastes resulting from the production of $^{99}$Mo and containing $^{106}$Ru were adjusted to pHs in the range of 2.1 to 12.5. Then, the samples were passed through columns packed with the adsorbent comprising a mixture of activated carbon with zinc and palladium powders. The results are shown in Table 1.

TABLE 1

| pH of liquid wastes feed | $^{106}$Ru radioactivity level (μCi/ml) Feed | Effluent | Decontamination factor |
|---|---|---|---|
| 12.5 | $5.3 \times 10^{-2}$ | undetected | $>10^2$ |
| 11.3 | $5.3 \times 10^{-2}$ | undetected | $>10^2$ |
| 10.3 | $5.3 \times 10^{-2}$ | undetected | $>10^2$ |
| 8.3 | $5.3 \times 10^{-2}$ | undetected | $>10^2$ |
| 3.7 | $5.3 \times 10^{-2}$ | undetected | $>10^2$ |
| 2.1 | $5.3 \times 10^{-2}$ | undetected | $>10^2$ |

The data in Table 1 show that the performance of the column packed with a mixture of activated carbon with zinc and palladium powders was independent of the acidity of the waste liquor that was passed through the column.

Comparative Example 1

Two columns were prepared; one was packed with a mixture of activated carbon with zinc and palladium powders, and the other was packed with a mixture of activated carbon and zinc powder. Varying amounts of group separated waste liquor containing $^{106}$Ru and adjusted to an alkaline pH (=10.1) with sodium hydroxide were passed through each column. The results are shown in Tables 2 and 3.

TABLE 2

Column Packed with Mixture of Zn Powder and Activated Carbon

| Amount of liquid wastes fed (ml) | $^{106}$Ru radioactivity level (μCi/ml) Feed | Effluent | Decontamination factor |
|---|---|---|---|
| 30 | $3.9 \times 10^{-2}$ | $4.1 \times 10^{-4}$ | 96 |
| 64 | $3.9 \times 10^{-2}$ | $1.4 \times 10^{-3}$ | 28 |
| 98 | $3.9 \times 10^{-2}$ | $2.1 \times 10^{-3}$ | 19 |
| 120 | $3.9 \times 10^{-2}$ | $2.5 \times 10^{-3}$ | 16 |
| 190 | $3.9 \times 10^{-2}$ | $5.3 \times 10^{-3}$ | 7 |

TABLE 3

Column Packed with Mixture of Activated Carbon with Zn and Pd Powders

| Amount of liquid wastes fed (ml) | $^{106}$Ru radioactivity level (μCi/ml) Feed | Effluent | Decontamination factor |
|---|---|---|---|
| 30 | $3.9 \times 10^{-2}$ | $\sim 1.5 \times 10^{-5}$ | $>10^3$ |
| 64 | $3.9 \times 10^{-2}$ | $2.9 \times 10^{-4}$ | 140 |
| 98 | $3.9 \times 10^{-2}$ | $5.8 \times 10^{-4}$ | 68 |
| 140 | $3.9 \times 10^{-2}$ | $8.9 \times 10^{-4}$ | 44 |
| 200 | $3.9 \times 10^{-2}$ | $1.5 \times 10^{-3}$ | 26 |
| 240 | $3.9 \times 10^{-2}$ | $2.0 \times 10^{-3}$ | 20 |

COMPARATIVE EXAMPLE 2

Two columns were prepared; one was packed with a mixture of activated carbon with zinc and palladium powders, and the other was packed with a mixture of activated carbon and zinc powder. Varying amounts of group separated liquid wastes containing $^{106}$Ru and adjusted to an acidic pH (=2.2) with nitric acid were passed through each column. The results are shown in Tables 4 and 5.

TABLE 4

Column Packed with Mixture of Zn Powder and Activated Carbon

| Amount of liquid wastes fed (ml) | $^{106}$Ru radioactivity level (μCi/ml) Feed | Effluent | Decontamination factor |
|---|---|---|---|
| 26 | $3.9 \times 10^{-2}$ | $2.5 \times 10^{-4}$ | 160 |
| 58 | $3.9 \times 10^{-2}$ | $3.3 \times 10^{-4}$ | 120 |
| 96 | $3.9 \times 10^{-2}$ | $2.8 \times 10^{-4}$ | 140 |
| 130 | $3.9 \times 10^{-2}$ | $2.8 \times 10^{-4}$ | 140 |
| 150 | $3.9 \times 10^{-2}$ | $4.8 \times 10^{-4}$ | 82 |

TABLE 5

Column Packed with Mixture of Activated Carbon with Zn and Pd Powders

| Amount of liquid wastes fed (ml) | $^{106}$Ru radioactivity level (μCi/ml) Feed | Effluent | Decontamination factor |
|---|---|---|---|
| 26 | $3.9 \times 10^{-2}$ | $4.2 \times 10^{-5}$ | 940 |
| 58 | $3.9 \times 10^{-2}$ | $1.7 \times 10^{-4}$ | 230 |
| 100 | $3.9 \times 10^{-2}$ | $2.4 \times 10^{-4}$ | 160 |
| 130 | $3.9 \times 10^{-2}$ | $2.7 \times 10^{-4}$ | 150 |
| 150 | $3.9 \times 10^{-2}$ | $4.5 \times 10^{-4}$ | 87 |

Whether the liquid wastes to be treated were acidic or alkaline, the adsorbent according to the present invention that was comprised of a mixture of activated carbon with zinc and palladium powders was more effective in $^{106}$Ru removal than the adsorbent consisting of a mixture of activated carbon and zinc powder. The advantage of the addition of palladium powder was particularly obvious in the alkaline waste liquor.

EXAMPLE 2

The column that was packed with a mixture of activated carbon with zinc and palladium powders and through which varying amounts of group separated liquid wastes in Comparative Example 2 were passed washed by passage of 30 ml of water. Thereafter, varying amounts of group separeted liquid wastes adjusted to pH 2.8 with nitric acid were passed through the same column to examine whether the column could be regenerated by washing with water. The results are shown in Table 6.

TABLE 6

| Amount of liquid wastes fed (ml) | $^{106}$Ru radioactivity level (μCi/ml) Feed | Effluent | Decontamination factor |
|---|---|---|---|
| 25 | $3.9 \times 10^{-2}$ | $4.3 \times 10^{-5}$ | 910 |
| 50 | $3.9 \times 10^{-2}$ | $2.1 \times 10^{-4}$ | 190 |
| 75 | $3.9 \times 10^{-2}$ | $4.6 \times 10^{-4}$ | 85 |
| 100 | $3.9 \times 10^{-2}$ | $4.6 \times 10^{-4}$ | 85 |

EXAMPLE 3

Varying amounts of group separated liquid wastes containing $^{106}$Ru and adjusted to pH 8.5 with sodium hydroxide were passed through a column packed with a mixture of activated carbon with zinc and palladium powders. Thereafter, the column was washed with 30 ml of aqueous nitric acid (pH: 2.2), and again fed with varying amounts of group separated liquid wastes that had been adjusted to pH 7.6. The effectiveness of aqueous nitric acid in regenerating the deactivated column will be apparent from the following Tables 7 and 8.

TABLE 7

| Amount of liquid wastes fed (ml) | Initial Pass: $^{106}$Ru radioactivity level (μCi/ml) Feed | Effluent | Decontamination factor |
|---|---|---|---|
| 25 | $3.9 \times 10^{-2}$ | $9.4 \times 10^{-5}$ | 420 |
| 50 | $3.9 \times 10^{-2}$ | $9.9 \times 10^{-4}$ | 40 |
| 75 | $3.9 \times 10^{-2}$ | $8.7 \times 10^{-4}$ | 45 |

TABLE 7-continued

| Amount of liquid wastes fed (ml) | Initial Pass: $^{106}$Ru radioactivity level (μCi/ml) Feed | Effluent | Decontamination factor |
|---|---|---|---|
| 100 | $3.9 \times 10^{-2}$ | $1.1 \times 10^{-4}$ | 36 |

TABLE 8

| Amount of liquid wastes fed (ml) | Second Pass after Washing: $^{106}$Ru radioactivity level (μCi/ml) Feed | Effluent | Decontamination factor |
|---|---|---|---|
| 25 | $3.9 \times 10^{-2}$ | $1.3 \times 10^{-4}$ | 300 |
| 50 | $3.9 \times 10^{-2}$ | $5.0 \times 10^{-4}$ | 80 |
| 75 | $3.9 \times 10^{-2}$ | $5.1 \times 10^{-4}$ | 77 |
| 100 | $3.9 \times 10^{-2}$ | $4.6 \times 10^{-4}$ | 85 |

The results in Examples 2 and 3 show that a deactivated adsorbent comprising a mixture of activated carbon with zinc and palladium powders could be effectively regenerated by washing with water when the adsorbent was used to remove $^{106}$Ru from an acidic radioactive liquid waste, whereas washing with aqueous nitric acid proved effective when an alkaline liquid wastes were fed through the column.

By reading the foregoing description, it will be understood that the present invention has the following advantages: (1) the claimed method utilizes both the adsorbing action of activated carbon and the electrochemical action that occurs between the carbon palladium electrode and the zinc electrode in the liquid electrolyte liquid wastes and as a result, the method is capable of removing nitrosyl ruthenium compounds that have been difficult to eliminated by the conventional techniques, and this contributes to a higher efficiency in $^{106}$Ru removal; (2) the ability of the adsorbent to remove $^{106}$Ru is not dependent on the pH of the liquid wastes to be passed through the column; and (3) if the ability of the adsorbent to remove $^{106}$Ru becomes reduced, it can be reactivated by washing with aqueous nitric acid or water.

What is claimed is:

1. A method of processing radioactive liquid wastes containing radioactive ruthenium by passing said wastes having pH of about 2 to about 12 through a column packed with an adsorbent comprising a 1:1:0.01 mixture of activated carbon, zinc and palladium powders.

2. A method according to claim 1 which further includes the step of regenerating a deactivated adsorbent by passing aqueous nitric acid or water through the column containing such deactivated adsorbent.

* * * * *